(12) United States Patent
Chen

(10) Patent No.: US 8,748,821 B2
(45) Date of Patent: Jun. 10, 2014

(54) ENERGY RECYCLING DEVICE

(76) Inventor: Yi-Yi Chen, New Taipei (TW)

(*) Notice: Subject to any disclaimer, the term of this patent is extended or adjusted under 35 U.S.C. 154(b) by 0 days.

(21) Appl. No.: 13/547,054

(22) Filed: Jul. 12, 2012

(65) Prior Publication Data

US 2014/0016385 A1 Jan. 16, 2014

(51) Int. Cl.
*G01J 5/00* (2006.01)
*H02N 6/00* (2006.01)

(52) U.S. Cl.
CPC ........................ *H02N 6/00* (2013.01)
USPC .................................................. 250/338.1

(58) Field of Classification Search
CPC .................... H02N 6/00; H02N 11/002
USPC .............................. 250/338.1–338.5
See application file for complete search history.

(56) References Cited

U.S. PATENT DOCUMENTS

| 2009/0095908 A1* | 4/2009 | Bollhorst | 250/338.3 |
| 2009/0108202 A1* | 4/2009 | Gritz et al. | 250/338.1 |

FOREIGN PATENT DOCUMENTS

| JP | 55066724 A * | 5/1980 | G01J 5/12 |
| JP | 58080719 A * | 5/1983 | G05F 1/64 |

* cited by examiner

*Primary Examiner* — Kiho Kim

(57) ABSTRACT

The present invention is related to an energy recycling device. The energy recycling device includes a substrate, multiple miniature receivers, for receiving infrared radiation, on the substrate and multiple current rectifiers electrically connected to the miniature receivers respectively. The miniature receivers transform the infrared radiation into alternating currents (AC). The current rectifiers rectify the alternating currents (AC) so as to transform the alternating currents (AC) into direct currents (DC). Thereby, the infrared radiation received by the miniature receivers can be first transformed into the alternating currents (AC) with extremely high frequencies, and then the alternating currents (AC) with extremely high frequencies can be transformed into direct currents (DC) usable by an electronic device. Accordingly, infrared can be used to supply power.

4 Claims, 6 Drawing Sheets

ENERGY RECYCLING DEVICE

BACKGROUND OF THE DISCLOSURE a) Field of the Disclosure

The invention relates to an energy recycling device, and more particularly, to an energy recycling device having a function of transforming an infrared into electric energy.

b) Brief Description of the Related Art

An infrared is widely applied, for example, to infrared pens for a brief or to infrared remote controller. Besides used for transmitting control signals, a general infrared device is used for an indicator. Current electricity consumption is so enormous that various ways to generate electricity are devoted to be researched in various parties. For example, solar power, wind power or sea flow can be transformed into electric power. If infrared can be applicable to supplying power, diversification of supplying power can be provided in surrounding environments.

Accordingly, inventors and firms in this industry are pursuing for solving the above conventional deficiencies.

SUMMARY OF THE DISCLOSURE

In order to improve the above disadvantages, the inventors collected related information, had evaluation and consideration in many ways based on long experience in this field and straight did tests and modification, and finally an energy recycling device having a function of transforming an infrared into electric energy can be developed.

In accordance with an objective of the present invention, infrared can be used to supply power by a miniature receiver for receiving infrared radiation, accompanying with a current rectifier for rectifying an electric current so as to transform an alternating current (AC) into a direct current (DC) receivable by an electronic device.

In order to achieve the above objective, a main structure in accordance with the present invention includes a substrate, multiple miniature receivers, for receiving infrared radiation, on the substrate and multiple current rectifiers electrically connected to the miniature receivers respectively. The miniature receivers transform the infrared radiation into alternating currents (AC). The current rectifiers rectify the alternating currents (AC) so as to transform the alternating currents (AC) into direct currents (DC). The current rectifiers include at least a shield having a geometry shape and a magnetic element adjacent to an end of the shield. Thereby, when the current rectifiers receive the alternating currents (AC) transformed by the miniature receivers, moving electrons in a magnetic field are affected by a magnetic force such that an electron moving rightward is biased downward due to the magnetic field and is bounced after blocked by the shield, and an electron moving leftward is biased upward due to the magnetic field and passes through the shield. Thereby, current rectification can be achieved and the alternating currents (AC) can be transformed into the direct currents (DC).

Accordingly, besides used for controlling, infrared in accordance with the present invention can be used for supplying power.

The accompanying drawings are included to provide a further understanding of the invention, and are incorporated as a part of this specification. The drawings illustrate embodiments of the invention and, together with the description, serve to explain the principles of the invention.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

Figure 1:
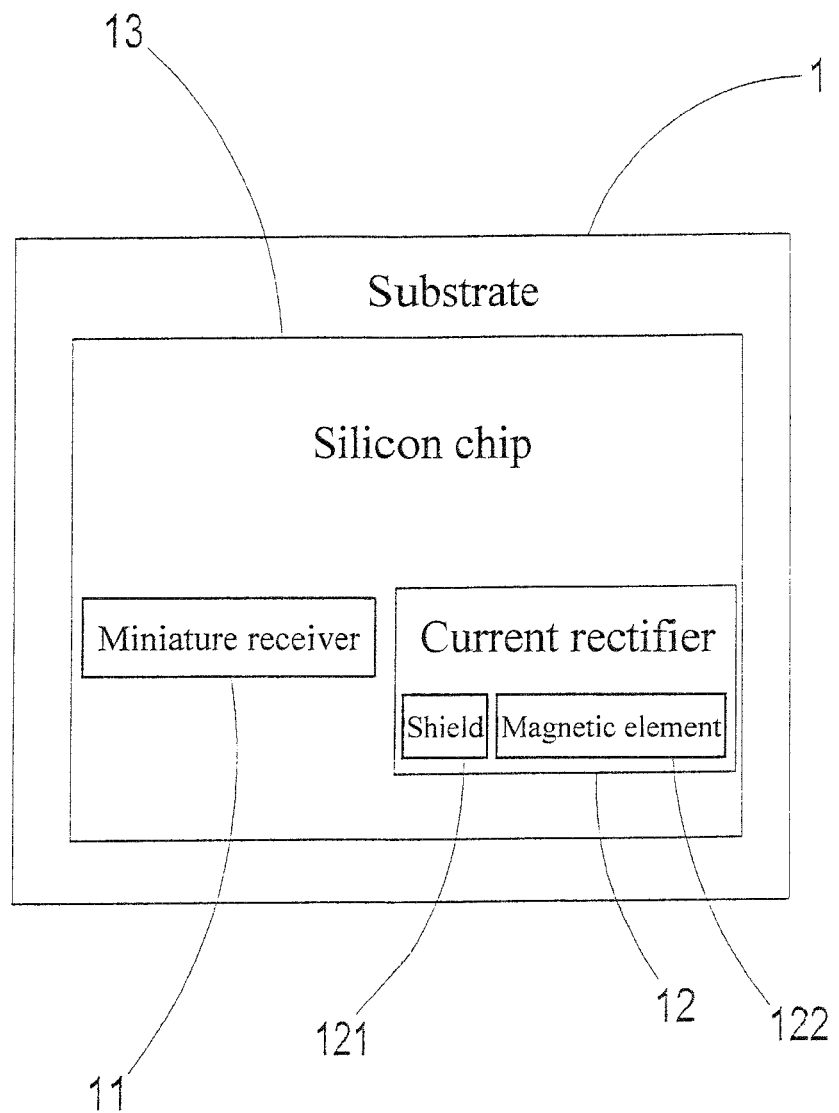
FIG. 1 is a structural block diagram in accordance with an embodiment of the present invention.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF THE INVENTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

FIG. 1 is a structural block diagram in accordance with an embodiment of the present invention. Referring to FIG. 1, a main structure in accordance with the present invention includes a substrate 1, a plurality of miniature receiver 11, for receiving infrared radiation, arranged on the substrate 1, wherein the miniature receiver 11 can transform the infrared radiation into an alternating current (AC) with a high frequency, and the miniature receiver 11 is a miniature nano-receiver having a volume less than 0.1 micrometers, and a plurality of current rectifier 12 electrically connected to the miniature receivers 11 respectively and arranged on the substrate 1, wherein the current rectifier 12 rectifies the alternating current (AC) so as to transform the alternating current (AC) into a direct current (DC), and the current rectifier 12 include at least a shield 121 having a geometry shape and a magnetic element 122 adjacent to an end of the shield 121.

Besides, using nanotechnologies, the miniature receivers 11 and current rectifiers 12 are formed on a silicon chip 13 by an etching process, and then arranged on the substrate 1 by pressing and printing processes. Thereby, the infrared radiation can be well received and transformed into a usable electric power.

Figure 2:
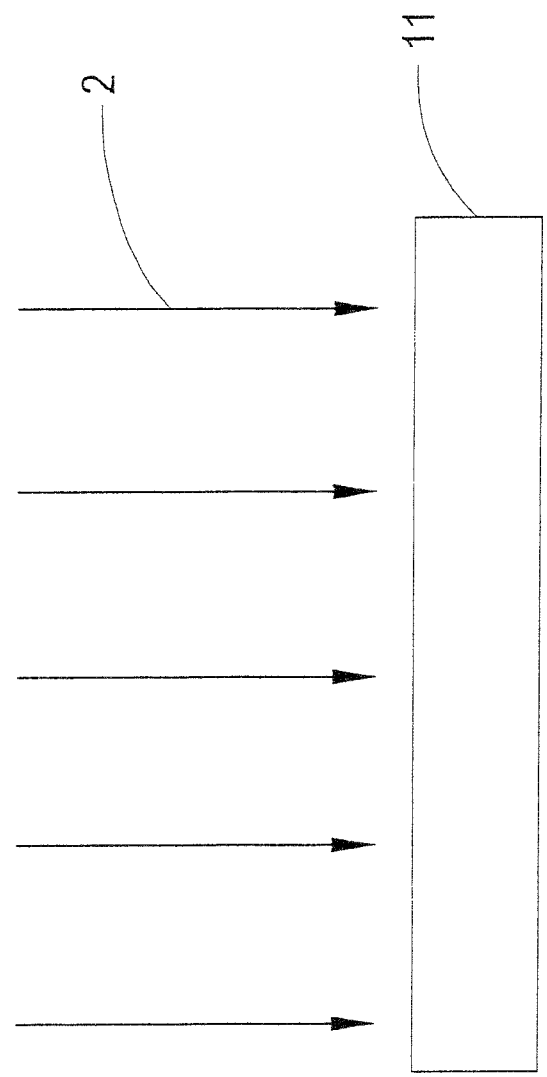
FIG. 2 is a schematic view of a miniature receiver operating in accordance with an embodiment of the present invention.
Figure 3:
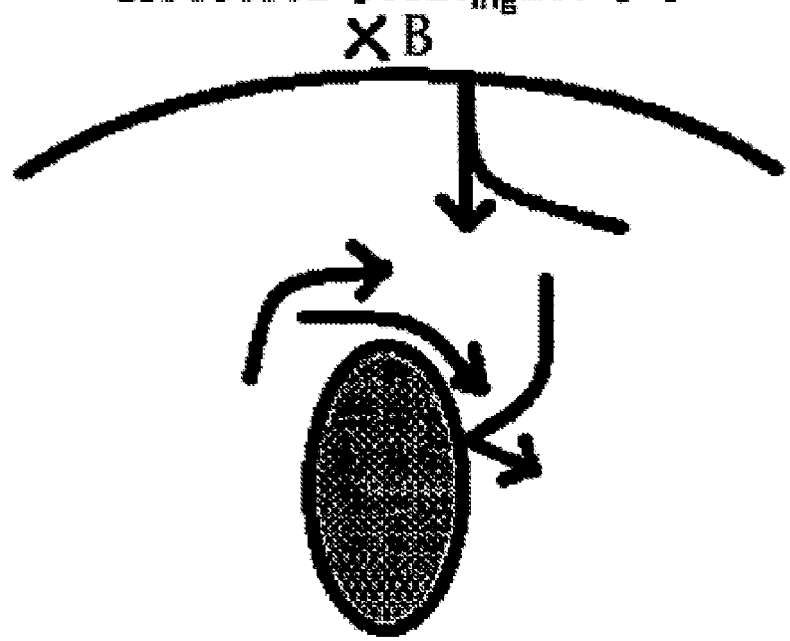
FIG. 3 is a schematic view of a current rectifier operating in accordance with an embodiment of the present invention.

Using the above structure, the operation in accordance with the present invention is described as below. FIGS. 1-3 are a structural block diagram and schematic views of a miniature receiver and current rectifier operating in accordance with an embodiment of the present invention. Referring to FIGS. 1-3, when the miniature receiver 11 receives 80% of infrared radiation 2 (heat quantity), the infrared radiation 2 is transformed into an alternating current (AC) with an extremely high frequency ranging from THz to PetaHz. Next, the alternating current (AC) can be rectified by a current rectifier 12 and transformed into a direct current (DC), described as below.

Because the shield 121 has an asymmetric geometry shape, low resistance and extremely low capacitance can be effectively blocked. Upon the current rectifier 12 receiving the alternating current (AC) transformed by the miniature receiver 11, moving electrons 3 and 4 in a magnetic field are affected by a magnetic force created by the magnetic element 122 such that the electrons 3 moving rightward are biased downward due to the magnetic field and are bounced after blocked by the shield 121, and the electrons 4 moving leftward are biased upward due to the magnetic field and pass through the shield 121. Thereby, current rectification can be achieved and the alternating current (AC) can be transformed into the direct current (DC).

Figure 4:
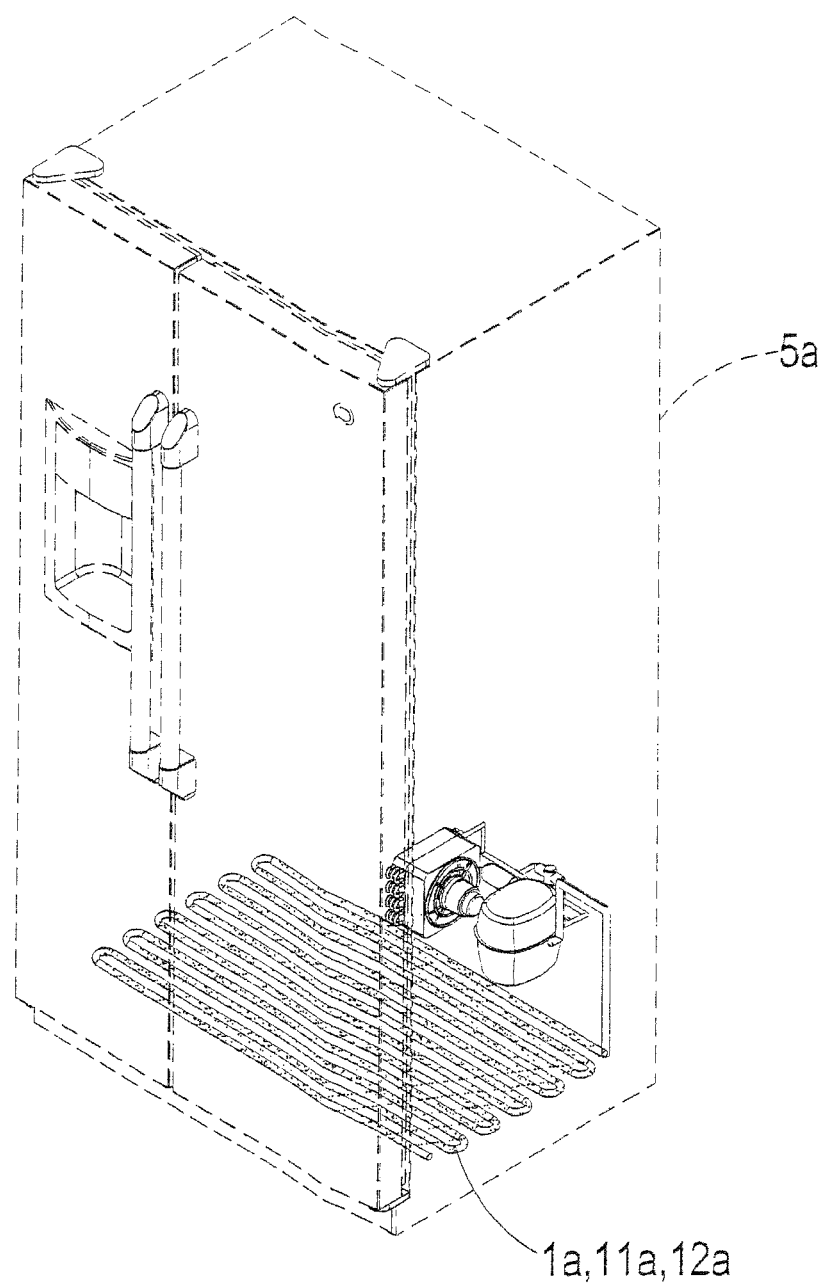
FIG. 4 is a schematic view in accordance with a first embodiment of the present invention.

FIG. 4 is a schematic view in accordance with a first embodiment of the present invention. Referring to FIG. 4, multiple of the miniature receivers 11a are arranged on the substrate 1a and multiple of the current rectifiers 12a are electrically connected to the miniature receivers 11a. In this embodiment, the substrate 1a can be set at a heat radiator of a refrigerator 5a. Thereby, infrared radiation created by the refrigerator 5a can be received and transformed into an electric power.

Figure 5:
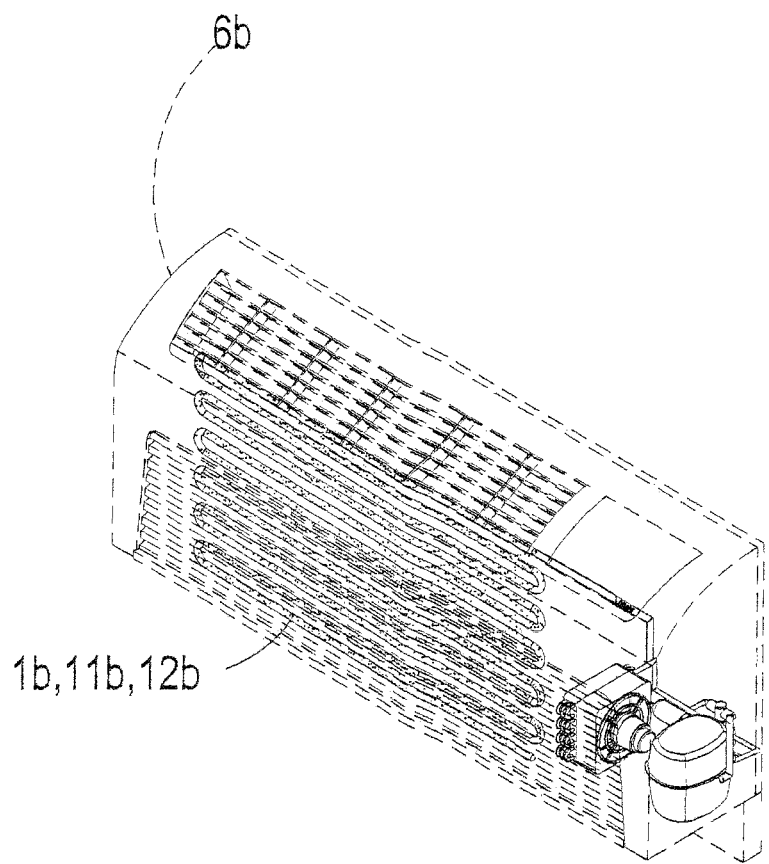
FIG. 5 is a schematic view in accordance with a second embodiment of the present invention.

FIG. 5 is a schematic view in accordance with a second embodiment of the present invention. Referring to FIG. 5, multiple of the miniature receivers 11b are arranged on the substrate 1b and multiple of the current rectifiers 12b are electrically connected to the miniature receivers 11b. In this embodiment, the substrate 1b can be set at a heat radiator of an air conditioner 6b. Thereby, infrared radiation created by the air conditioner 6b can be received and transformed into an electric power.

Figure 6:
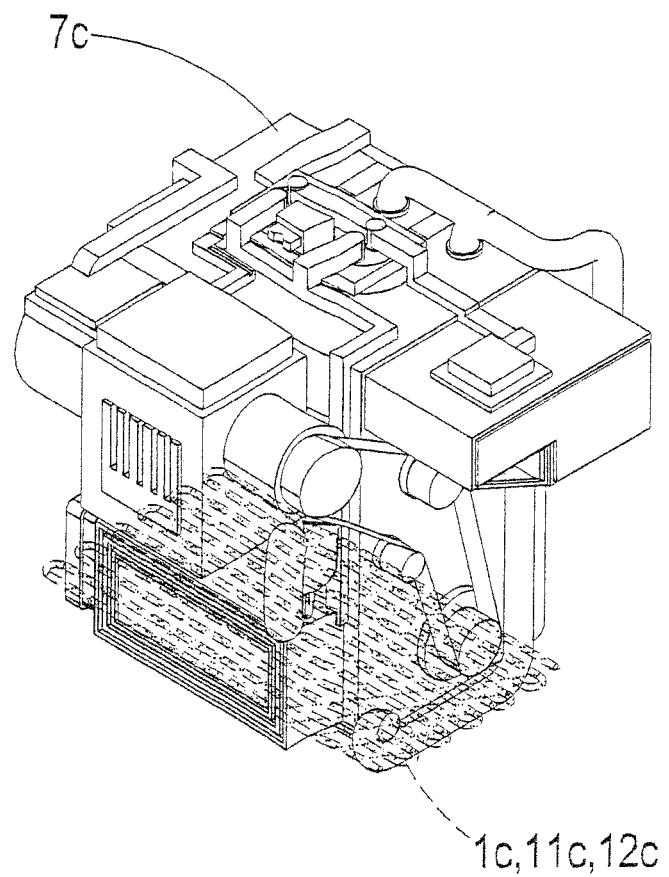
FIG. 6 is a schematic view in accordance with a third embodiment of the present invention.

FIG. 6 is a schematic view in accordance with a third embodiment of the present invention. Referring to FIG. 6, multiple of the miniature receivers 11c are arranged on the substrate 1c and multiple of the current rectifiers 12c are electrically connected to the miniature receivers 11c. In this embodiment, the substrate 1c can be set at an engine 7c of an electric car. Thereby, infrared radiation created by the engine 7c of the electric car can be received and transformed into an electric power.

Accordingly, compared with the prior art, the present invention has the following advantages:

Infrared can be used to supply power by the miniature receiver 11 for receiving infrared radiation 2, accompanying with the current rectifier 12 for rectifying an electric current so as to transform an alternating current (AC) into a direct current (DC) receivable by an electronic device.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. An energy recycling device comprising:
a substrate;
multiple miniature receivers, which can receive infrared radiation on the substrate, wherein the miniature receivers transform the infrared radiation and visible light into an alternating current (AC); and
multiple current rectifiers on the substrate, wherein the current rectifiers are electrically connected to the miniature receivers respectively, wherein the current rectifiers comprise at least non-conductor barrier (discontinuation of conducting area) having a geometry shape and a magnetic element creating a steady magnetic field passing through the rectifier.

2. The energy recycling device of claim 1, wherein the steady magnetic field passing through the rectifier and non-conductor barrier (discontinuation of conducing area) and the geometry shape in the current rectifier affect the flow of electric current in the way that (assuming the rightward direction is the forward direction) electrons moving rightward (the forward direction) are biased downward due to the magnetic field and pass through and then are trapped to the right by the non-conductor barrier (discontinuation of conducing area) and electrons moving leftward (the reverse direction) are biased upward due to the magnetic field and are bounced back due to the shape and electrons moving upward are biased rightward (the forward direction) due to the magnetic field and pass through to the right and electrons moving downward are biased leftward (the reverse direction) due to the magnetic field and are bounced back to the right after blocked by the non-conductor barrier (discontinuation of conducing area).

3. The energy recycling device of claim 1, wherein using nanotechnologies, the miniature receivers and current rectifiers are formed as a silicon chip by a process comprising etching, and then arranged on the substrate by a process comprising pressing and printing.

4. The energy recycling device of claim 1, wherein the alternating current (AC) has a high frequency.

* * * * *